May 22, 1956    J. V. FITZGERALD ET AL    2,747,105
TRANSPARENT NUCLEAR RADIATION SHIELD
Filed Nov. 29, 1951
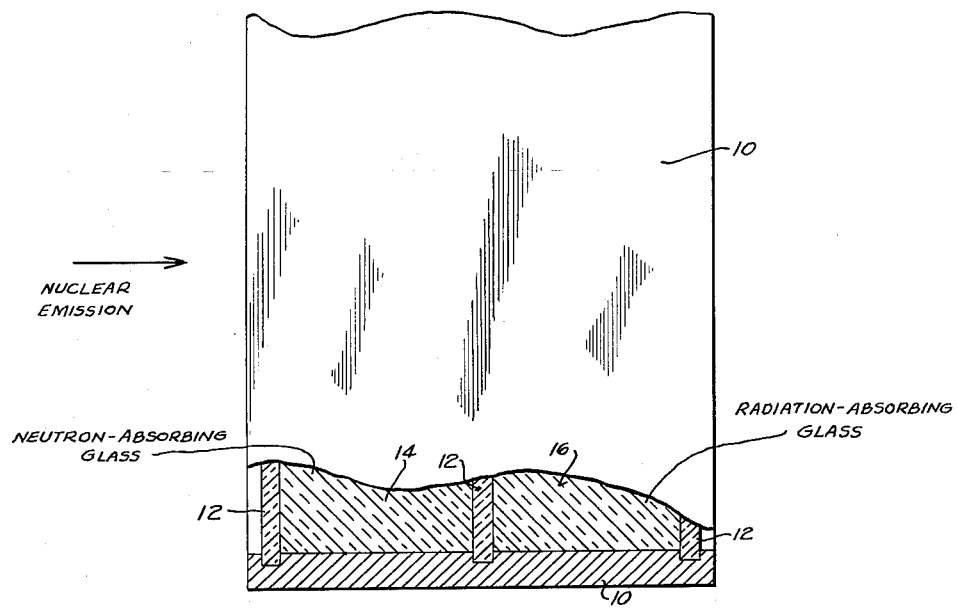
J. V. FITZGERALD and
G. S. BACHMAN,
                    INVENTORS
BY  Oscar L. Spencer
                ATTORNEY United States Patent Office 2,747,105
Patented May 22, 1956

2,747,105

TRANSPARENT NUCLEAR RADIATION SHIELD

John V. Fitzgerald and George S. Bachman, New Kensington, Pa., assignors to Pittsburgh Plate Glass Company Application November 29, 1951, Serial No. 258,944

6 Claims. (Cl. 250—108)

This invention pertains to radiation shields, and particularly to shields which will afford protection for personnel against beta and gamma radiations and both fast and slow neutrons, such as are produced by nuclear reactions of various kinds. It is a principal object of the invention to provide such a shield which will be substantially transparent to visible rays, whereby the operation and manipulation of nuclear reaction apparatus will be facilitated, but without any increase in the various radiation hazards to which the operators of such equipment are subjected.

In the present state of the art, concrete is the principal shielding material employed around nuclear reaction chambers and the like, because it is relatively economical and is capable of slowing down fast neutrons and capturing slow (thermal) neutrons. Also, it is somewhat opaque to beta and gamma radiation, although where protection against intensive gamma radiation is important, it is generally used in combination with lead. Ordinary water has been used to some extent for observation panels because of its well known properties of slowing down fast neutrons and capturing thermal neutrons, this being due to its hydrogen content, but it is not an effective shield against hard radiations, and its liquid form does not adapt it to structural purposes.

The present invention deals with the utilization of a combination of special glasses which provides opacity to the harder radiations encountered in nuclear reactions, and which will moderate fast neutrons and capture the resulting thermal neutrons, so as to make possible a shielding material which will be transparent to visual rays but will furnish adequate protection against the stated emanations, and whose solid form adapts it for use in observation windows or wherever protection and visibility are desired. The use of such material will permit the operators of nuclear reaction apparatus actually to see the equipment and materials in a reacting pile, and will therefore simplify such operations as charging and removal of the reacting fuel slugs and the like.

It is well known that the metallic elements of low atomic weight, such as lithium, beryllium and boron are similar in their neutron-moderating effects to the hydrogen present in water, paraffin and other hydrocarbons often used for neutron absorption. It is also known that boron and certain other metals are effective for the capture of neutrons of thermal velocities resulting from the moderating action of those materials. The present invention provides for the utilization of a glass composed largely of compounds of such light elements to accomplish the functions of neutron capture in a transparent material, such material being combined with another type of transparent glass characterized by relatively high opacity to beta and gamma radiation. The invention further comprehends the use of additional elements, and a special structural form for the combination of principal glasses, to adapt the same most effectively for the intended purpose.

According to a further feature of the invention, the glasses used in making up the composite material may have incorporated therein a small quantity of a material, such as cerium oxide ($CeO_2$) which has the characteristic of inhibiting the darkening or discoloration of most glasses when exposed to beta or especially gamma (X ray) radiation. While such an additive normally imparts a slight yellowish color to the glass, its effect in preventing more serious discoloration under irradiation makes it valuable where the material is to be exposed more or less continually to such radiations.

By way of example, and not of limitation, a suitable glass for the neutron-moderating and capturing component of the invention may be composed of:

| | Percent |
|---|---|
| Berryllium oxide ($BeO_2$) | 10–20 |
| Lithium oxide ($Li_2O$) | 10–20 |
| Cerium oxide ($CeO_2$) | 0.3–2.0 |
| Boric oxide ($B_2O_3$) | Balance |

While such glasses are suitable as neutron moderators, they are relatively transparent to both beta and gamma radiation; hence, they would not alone be suitable for nuclear reaction shields. However, glass compositions are known which combine visual transparency with opacity to the hard radiations mentioned. Such glasses have been proposed for X-ray shields, and are selected from the dense lead-boro-silicate types.

In accordance with the invention, therefore, the transparent shield would consist of a suitable thickness of each of the above glasses, arranged with the neutron-moderating glass nearest the nuclear reaction chamber in order to capture a major portion of the neutron emission prior to its impingement upon the heavier metal nuclei in the outer layer. Calculations show that the necessary thicknesses of these glasses to achieve the desired degree of attenuation are comparable to the thicknesses of other (non-transparent materials heretofore utilized. For example, a thickness of four feet of iron and paraffin attenuates 2 m. e. v. gamma radiation by a factor of $10^{-9}$, and absorbs a reasonable proportion of impinging neutrons, while about eight feet of concrete is required for the same degree of attenuation. A total thickness of less than six feet of the special composite glass assembly according to the invention (three feet of each type) would provide an attenuation of the same order for gamma radiation, and would be a very effective neutron absorber.

Clearly, the problem of providing suitable surfaces for glass slabs or sheets of this order of thickness, considering the optical viewing purpose of the assembly, would be considerable; the cost of grinding and polishing such bulky and unwieldy blocks would be very high. We therefore propose that the assembly be made up by casting the two special glass compositions making up the assembly into preformed cells opposite sides of which are made of polished plates of still another glass composition chosen to have a higher melting point than the others and characterized by freedom from the effect of darkening under irradiation. The prior art affords numerous examples of such materials, and they may be fabricated and polished in the form of relatively thin plates without great expense. These polished plates will thus form the outer surfaces of the composite assembly (and if required, the interface thereof). The cells will be completed by a suitable metallic frame forming with the polished plates a cell to receive the cast glasses constituting the main bulk of the device.

The drawing illustrates one form which the assembly may take, part being broken away to show the component parts more clearly. Numeral 10 designates the outer metal frame of the cell, while numeral 12 indicates the polished end plates and a central plate all formed of a non-darkening glass having a higher melting point. The beryllia-lithia-boric oxide glass forming the neutron absorber is indicated at 14, and the dense lead-boro-silicate gamma ray absorber at 16. These two materials may be cast directly into the cells and will fuse or be in intimate optical contact with the polished surfaces of the plates 12 to provide clear vision through the assembly without the necessity of individually polishing the thick masses of the absorbing glasses. It will be understood that the drawing does not show the respective thicknesses to scale, as these will be dictated by the design considerations in each case, and are within the ability of the skilled worker in this art. It may be mentioned that the weight of a window or panel of given size when made of the materials stated herein compares favorably with the same size of element when made of concrete (density 2.5); the density of the glass 14 being about 2.3 and that of the glass 16 about 5.8.

While we have disclosed our invention in connection with a preferred embodiment whose characteristics have been stated in detail, it is to be understood that the compositions and arrangements can be varied without departing from the scope of the invention; thus, it is to be expected that other glasses composed principally of light metal oxides would show the characteristics of neutron absorption; these might include a lithium borate or a beryllium borate glass, or even a pure $B_2O_3$ glass. The invention is thus not to be deemed to be restricted to the materials disclosed, as its scope is intended to be limited only by the appended claims.

We claim:

1. A nuclear radiation shield comprising, in combination, as assembly of two layers of glass materials each transparent to visible light, one layer being a glass consisting essentially of oxides of beryllium, lithium and boron and having the property of slowing down fast neutrons impinging thereon and of capturing slower neutrons, and the other layer being a dense lead-boro-silicate glass having the property of absorbing beta and gamma radiation, the combination being substantially opaque to harmful emanations from nuclear reactions.

2. A nuclear radiation shield in accordance with claim 1, in which each of said layers includes in its composition a minor percentage of an agent having the property of inhibiting the discoloration of glass under exposure to hard radiations.

3. A nuclear radiation shield in accordance with claim 2, in which said agent is cerium oxide.

4. A nuclear radiation shield comprising, in combination, an assembly of two layers of glass materials each transparent to visible light, the inner layer being a glass consisting essentially of oxides of beryllium, lithium and boron and having the property of slowing down fast neutrons impinging thereon and of capturing slower neutrons, and the outer layer being a dense lead-boro silicate glass having the property of absorbing beta and gamma radiation, the combination being substantially opaque to harmful emanations from nuclear reactions when placed with the first-recited layer facing such emanations.

5. A nuclear radiation shield comprising, in combination, an assembly of two thick layers of glass materials each transparent to visible light, one layer being a glass consisting essentially of oxides of beryllium, lithium and boron and having the property of slowing down fast neutrons impinging thereon and of capturing slower neutrons, the other layer being a dense lead-boron-silica glass having the property of absorbing beta and gamma radiation, the combination being substantially opaque to harmful emanations from nuclear reactions, and relatively thin sheets of transparent glass of higher melting point than said layers disposed to either side of and in intimate contact with both the said layers.

6. A nuclear radiation shield in accordance with claim 5, in which said sheets of glass are of compositions relatively free from discoloration under irradiation by short wave length radiation.

References Cited in the file of this patent

UNITED STATES PATENTS

| | | |
|---|---|---|
| 1,570,876 | Compton | Jan. 26, 1926 |
| 2,223,118 | Miller | Nov. 26, 1940 |
| 2,477,329 | Gier et al. | July 26, 1949 |
| 2,508,772 | Pontecorvo | May 23, 1950 |
| 2,532,386 | Armistead | Dec. 5, 1950 |

FOREIGN PATENTS

| | | |
|---|---|---|
| 8,704 | Great Britain | 1907 |
| 7,864 | Great Britain | 1913 |

OTHER REFERENCES

The Glass Industry, v. 26 (August 1945), pp. 373, 374, 382 and 384. Copy in Sci. Lib. Pub. Ogden Pub. Co., New York.